United States Patent [19]

Pollklas

[11] Patent Number: 5,749,783
[45] Date of Patent: May 12, 1998

[54] DEVICE FOR AUTOMATIC FILLING OF LOAD CONTAINERS

[75] Inventor: Manfred Pollklas, Rheda-Wiedenbrück, Germany

[73] Assignee: Claas KGaA, Harsewinkel, Germany

[21] Appl. No.: 703,983

[22] Filed: Aug. 28, 1996

[30] Foreign Application Priority Data

Aug. 29, 1995 [DE] Germany .................. 195 31 662.2

[51] Int. Cl.⁶ .................. A01D 90/00; A01D 90/10; A01F 12/48
[52] U.S. Cl. .................. 460/119; 460/114; 56/10.2 D; 414/345; 414/389
[58] Field of Search .................. 460/119, 23, 114, 460/115, 150; 56/10.2 D, 10.2 F, 194, 203, 207, 324, 324.5, 476; 414/340, 345, 389, 398

[56] References Cited

U.S. PATENT DOCUMENTS

| 3,964,620 | 6/1976 | Parsons | 141/95 X |
| 4,396,339 | 8/1983 | Johnson | 414/389 |
| 5,004,400 | 4/1991 | Handke | 414/786 |
| 5,167,581 | 12/1992 | Haag | 460/114 |
| 5,575,316 | 11/1996 | Pollklas | 414/345 X |

*Primary Examiner*—Terry Lee Melius
*Attorney, Agent, or Firm*—Michael J. Striker

[57] ABSTRACT

A device for automatic filling a traveling load container which travels adjacent to a traveling harvesting vehicle includes optical or acoustic sensors providing an optimal filling of the container. The sensors can be oriented toward the filling cone of the product stream and to the outer limits of the load container.

20 Claims, 2 Drawing Sheets

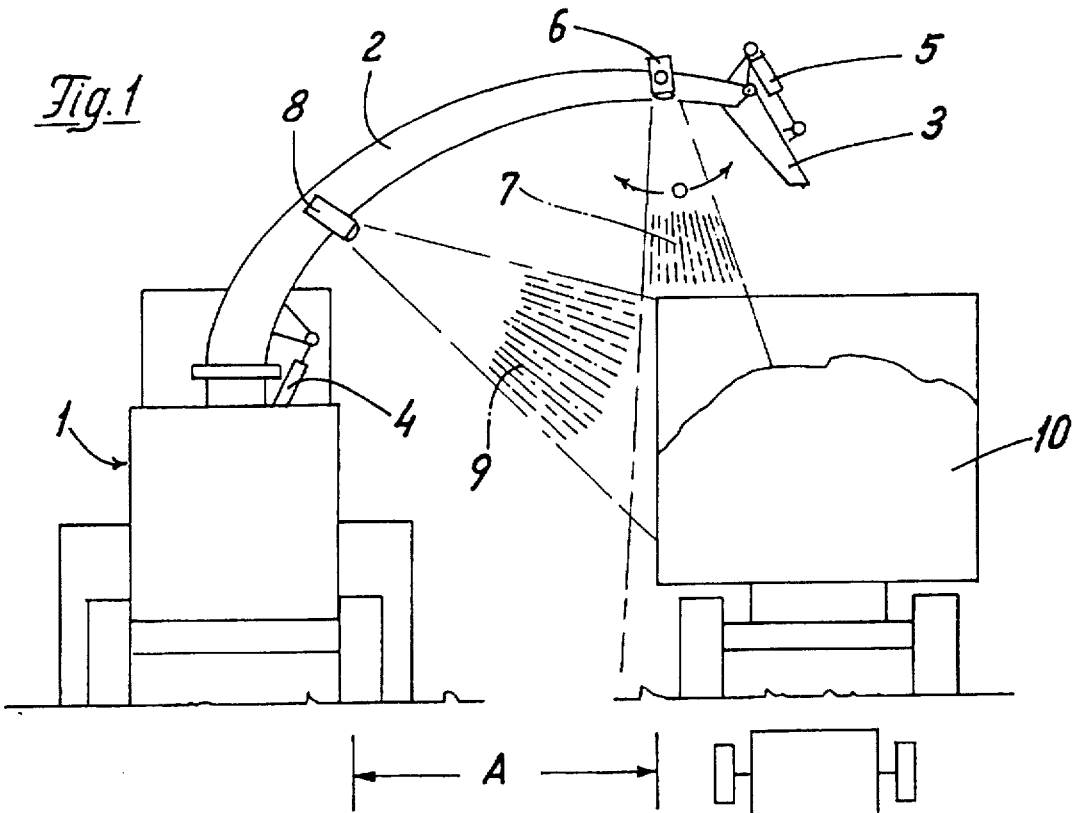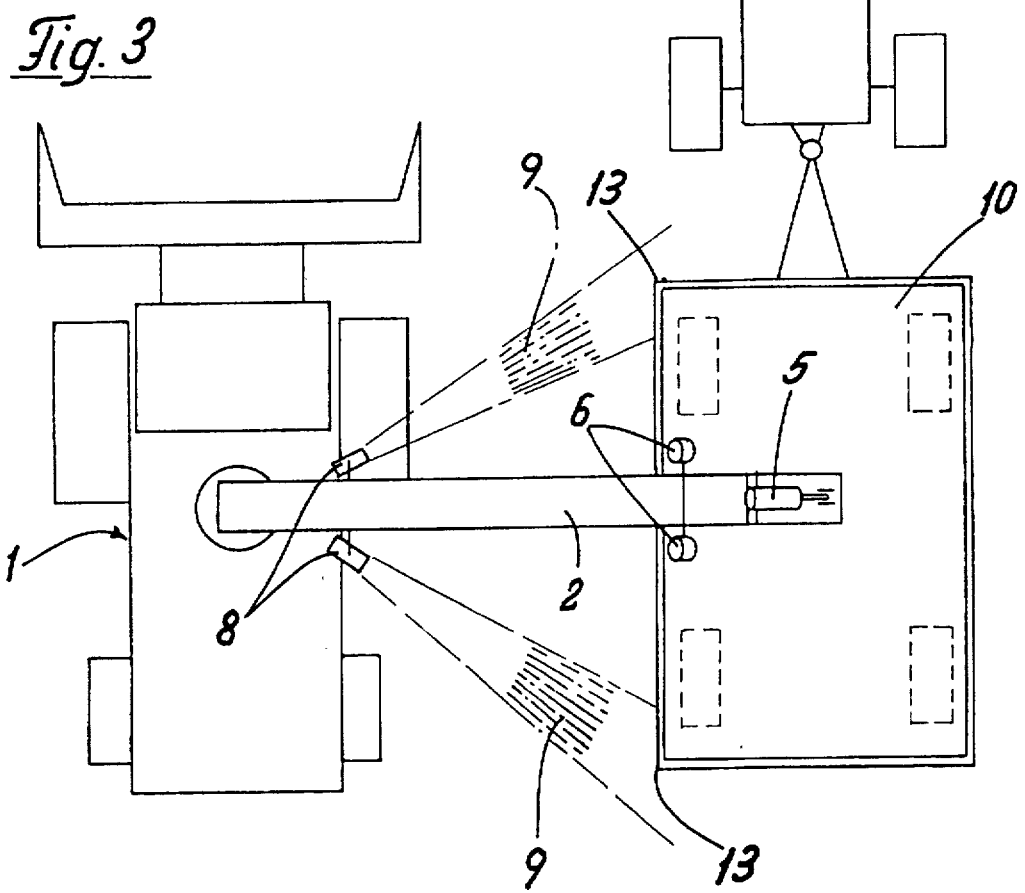

DEVICE FOR AUTOMATIC FILLING OF LOAD CONTAINERS

BACKGROUND OF THE INVENTION

The present invention relates to a device for automatic filling of a traveling load container with a product flow, in particular on an adjacent traveling harvesting machine such as a field chopper or a harvester thresher.

Devices of the above mentioned general type are known in the art. One of such devices is disclosed for example in the German Patent Document DE 44 03 893. The harvesting machines during the harvesting process received continuously a harvested product, process it a known and suitable manner, for example by threshing or separating of grains in a harvester thresher or by chopping in a field chopper, and transfer the harvested product for further treatment or use either continuously or after intermediate storage to a load container for further transportation. During a continuous discharge of the product stream it is very difficult for the driver of the harvesting machine to monitor simultaneously both the field region located in front of the harvesting machine as well as a lateral discharge of the harvested product into the load container. A continuous monitoring of the discharge of the harvested product is required since the harvesting machine and the load container traveling parallel to it during a forward movement move both in the longitudinal as well as in the transverse direction relative to one another and the discharge of the harvested product must be adjusted to this relative movement. Also during only timely discharge of the harvested product to a lateral load container, the driver must simultaneously concentrate on the forward travel and the discharge of the harvested product, which can lead to faulty operation. An automatic and reliably functionable control of the ejection manifold/discharge pipe/transfer band would mean an obvious facilitation of the operation for the driver of a harvesting machine.

A known device for automatic filling of load containers operates in the following manner. The load container is measured by at least one optical and/or acoustic sensor arranged above the load container and the filling height of the filling product is determined. It is achieved by supplying the distance signals obtained by the distance meter to an electronic evaluating and control unit, which continuously controls a turning position of the ejection manifold and/or a turning position of the ejection flap to provide maximum lossfree and complete filling of the load container.

In the practical use of this device it has been however determined that dust and long grass distort the sensor signal of the distance meter and therefore not in all application conditions completely error-free determination of the correct distance signals is guaranteed or calculation or the turning position by the electronic evaluating and control unit for maximum lossfree and complete filling of the container. Because of the high transporting efficiency of the field choppers and harvester threshers, during discharge of harvested product substantial losses can occur when an automatic filling device operates incorrectly. An amplification of the sensor pulses can not avoid the error, since the sensor signals are reflected by the whirling dust particles and long grass stalks, and with increasingly stronger sensor pulses the false distant measurement values are produced.

SUMMARY OF THE INVENTION

Accordingly, it is an object of present invention to provide a device for automatic filling of a load container, which avoids the disadvantages of the prior art.

More particularly, it is an object of present invention to provide a device for automatic filling of load containers, which is formed so that it performs its functions even in difficult conditions of its application.

In keeping with these objects and with others which will become apparent hereinafter, one feature of present invention resides, briefly stated, in a device for automatic filling of load containers, which has at least one additional optical and/or acoustic distance meter mounted on an ejection manifold and measuring a lateral distance between the harvesting machine and the load container and the measured distance values are supplied to the electronic evaluation and control device.

Since in the space between the harvesting machine and the load container as a rule there is no dust or flying grass stalks which distort the sensor signals, reliable measuring values are measured which are available in all harvesting conditions.

In accordance with a further embodiment of the present invention, the distance measuring values determined by the additional optical and/or acoustic distance meter, are utilized by the electronic evaluating and control unit for determination of nominal values for the turning position of the ejection manifold only when the one distance meter mounted on the injection manifold supplies the evaluating and control unit with distance signals which are recognized as defective. In order to unload the evaluating and control unit from insignificant evaluating and control processes, it is advantages to supply to the evaluating and control unit the distance signals from the additional optical and/or acoustic distance meter only when the difference of the measured distance value from an earlier measured distance value exceeds a definite limiting value.

In accordance with a further embodiment of the present invention, at least one additional optical and/or acoustic distance sensor also performs a scanning function, in accordance with which the relative movement of the load container with respect to the harvesting machine in a forward traveling direction is determined and the value of the measured relative movement is supplied to the evaluating and control unit. The additional optical and/or acoustic distance meter can be mounted instead of the ejection manifold, or also on or above the side surface of the agricultural machine.

In accordance with the present invention it is further proposed to use the optical and/or acoustic distance meter above the load container for determination of the filling height and to use the additional optical and/or acoustic distance meter for determination of the ejection width of the ejection manifold. During the evaluation of the distance signals from the distance meters, the evaluating and control unit can start from a standardized width of the load container, for example a width of 2.50 m. Instead of standard width of the load container, also an input device can be provided, with which the corresponding width of a load container to be filled can be inputted into the evaluating and control unit. Moreover, it is advantages when the normal nominal value of the nominal appearance point of the product stream in the load container to be filled determined by the evaluating and control unit is changeable by manually inputted signals or signals supplied from the sensors. It is therefore possible also in special operational conditions, such as for example during works on slopes or in strong winds, to guarantee a reliable filling of the load container. Inclination or wind measuring sensors can determine signal values which are supplied to the evaluating and control unit and in it a nominal value for the nominal appearance point corresponding to the special operational conditions is calculated to be used for controlling the overloading device. Instead of an ejection manifold of a field chopper, in the inventive arrangement also other overloading devices of a harvesting machine can be controlled, such as for example a grain tank, a discharge pipe of a harvester thresher or a transfer band of a potato harvester or a sugar beet digger.

In connection with a device for a throughput measurement, it is also possible to dispense with the known distance meter and to control the evaluating and control unit of the ejection manifold exclusively in dependence on the lateral distance of the harvesting machine from the load container and the measured throughput. In a software program for controlling the evaluating and control unit, a start can be made from a standard load container which is then filled in accordance with a characteristic line. When measurements of the load container deviating from a standard container are performed, they can be supplied to the evaluating and control unit by a keyboard, a scanning determination at the load container, or in another way.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view from behind of a field chopper traveling parallel to a load container and supplying a product stream into the load container;

FIG. 3 is a plan view of a harvesting machine and a laterally traveling load container.

DESCRIPTION OF PREFERRED EMBODIMENTS

Figure 2:
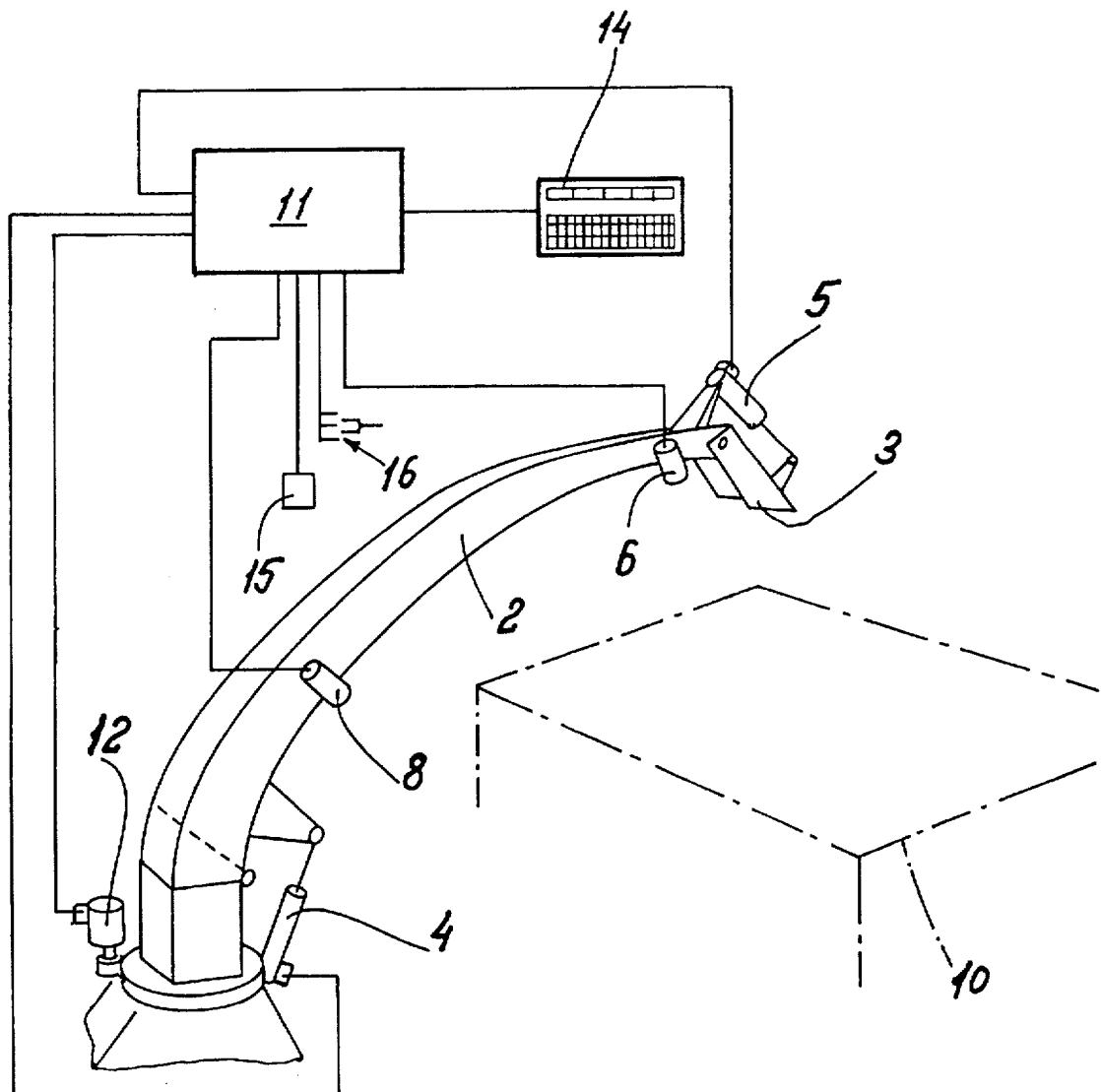
FIG. 2 is a schematic view showing an ejection manifold together with connections on an evaluating and control unit and associated actuators.

FIG. 1 shows a field chopper 1 from behind. It is provided with an ejection manifold 2 which is turnable about a vertical axis and height adjustable by a cylinder-piston unit 4. An ejection flap 3 is located at an ejection end of the ejection manifold and is also adjustable by a drive 5. An optical and/or acoustic distance meter 6 is mounted on the ejection manifold of the field chopper or the agricultural machine 1. During a turning movement it overlaps with its optical and/or acoustic emissions 7 a space located under the ejection cap 3 and simultaneously measures in a known manner the returned echo signals and converts the same into piston signals processed in an evaluating and control unit.

In addition to the distance sensor 6 mounted on the ejection manifold 2, a further optical and/or acoustic distance meter 8 is mounted on the ejection manifold. Its optical and acoustic emissions 9 are oriented laterally onto a load container 10 located near the harvesting machine 1. Also, the distance meter 8 measures the returned echo signals and determines from them in a known manner the distance signals processed by the evaluating and control unit. The evaluating and control unit therefore receives two distance signals: Distance signals from the distance meter 6 from which in a known manner the filling level and relative position of the of the side walls of the load container 10 are determined, and additionally the distance signals of the distance meter 8 which identifies the lateral distance A between the harvesting machine 1 and the load container or from which it can be produced.

FIG. 2 shows a connection of the distance meters 6 and 8 to the evaluating and control unit 11 which is composed of a microprocessor. By a suitable evaluating and control software, from the evaluating and control unit 11, adjustment commands are determined which or transmitted to the actuators 4, 5 and 12 for executing the adjustment commands. In the shown example the actuator 12 is provided for rotation of the ejection manifold about the vertical axis. The operator through the input device 14 can input additional information correction for computation of the predetermined value for the evaluating and control unit 11. Simultaneously, sensors 15 can be connected with the evaluating and control unit and supply important data for the control, such as for example wind strength and direction and/or inclined position of the harvesting machine. Moreover, the evaluating and control unit 11 is connected through an interface 16 to a conventional electronic system of the harvesting machine 1. Therefore values related to the throughput quantity, moisture, weight of the harvested product or the other data can be exchanged through the interface. It is also recommended to perform a CAN-bus communication with operating elements through the interface 16.

FIG. 3 shows that the length of the load container 10 as well as the relative position of the load container to the harvesting machine 1 can be determined by one or two distance meters 8. The distance meters 8 determine a defined scanning signal 9, from whose echo the distance to the lateral end 13 of the load container 10 is determined and supplied to the evaluating and control unit 11. With a suitable software program, the evaluating and control unit 11, from the position of the lateral ends 13 relative to the harvesting machine 1, determines the actual appearance point of the product stream in the load container 10 and during a relative movement of the harvesting machine 1 to the load container corrects the position of the ejection manifold 2. With the input device 14 connected to the evaluating and control unit 11 the nominal or correction values can be supplied to the evaluating and control unit 11. The nominal or correction values can deal for example with the length or width of the load container 10, the possible filling level of the load container, a predetermined value or change of the desired appearance point of the product stream in the load container, or similar operational parameters of the evaluating and control unit 11.

It will be understood that each of the elements described above, or two or more together, may also find a useful application in other types of constructions differing from the types described above.

While the invention has been illustrated and described as embodied in device for automatic filling of load containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for automatic filing of a traveling load container with a product stream at an adjacent traveling harvesting machine, comprising an ejection element turnable about at least one axis selected from the group consisting of a vertical axis and a horizontal axis and connectable with a harvesting machine; at least one distance sensor arranged on said ejection element and generating distance signals; an electronic evaluating and control unit receiving said distance signals from said distance sensor and correspondingly controlling a turning position of said ejection element; and at least one additional distance sensor arranged on said ejection element to measure a lateral distance between said traveling harvesting machine and said load container and to produce distance values which are also supplied to said electronic evaluating and control devices so as to provide additional control of said ejection element.

2. A device as defined in claim 1, wherein said ejection element is formed as an ejection manifold which is turnable about a vertical axis and a horizontal axis.

3. A device as defined in claim 2, wherein said ejection manifold has an end provided with a turnable ejection flap.

4. A device as defined in claim 1, wherein each of said distance sensors is formed as an optical distance sensor.

5. A device as defined in claim 1, wherein each of said distance sensors is formed as an acoustic distance sensor.

6. A device as defined in claim 1, wherein said distance sensors and said electronic evaluating and control unit are formed so that the distance values measured by said additional distance sensor are used for determination of nominal values for a turning position of said ejection element only when said first mentioned distance meter supplies to said evaluating and control unit signals which are known to be deficient.

7. A device as defined in claim 1, wherein said additional distance sensor is formed so that it supplies distance signals to said evaluating and control unit only when a difference between the measured distance value and an earlier measured distance value exceeds a predetermined limiting value.

8. A device as defined in claim 1, wherein said additional distance sensor is formed so that it performs a scanning function to determine a relative movement of the load container to the harvesting machine in a forward direction and to supply a value of the measured relative movement to said evaluating and control unit.

9. A device as defined in claim 1, wherein said additional distance sensor is mounted above of the harvesting machine.

10. A device as defined in claim 1, wherein said additional distance sensor is mounted on side surfaces of the harvesting machine.

11. A device as defined in claim 1, wherein said distance sensors are formed so that said first mentioned distance sensor is arranged above the loading container and determines a filling height, while said additional distance sensor is determined an ejection width of said ejection element.

12. A device as defined in claim 1, wherein said evaluating and control unit is formed so that it operates for controlling said ejection element starting from a predetermined width of the load container.

13. A device as defined in claim 11; and further comprising input means which supply said evaluating and control unit with a predetermined width of the load container to be filled.

14. A device as defined in claim 12; and further comprising input means which supply said evaluating and control unit with a predetermined width of the load container to be filled.

15. A device as defined in claim 1, wherein said evaluating and control unit is formed so that a normal nominal value of a nominal appearance point of the product stream in the load container to be filled is adjustable by manually inputted signals.

16. A device as defined in claim 1, wherein said evaluating and control unit is formed so that a normal nominal value of a nominal appearance point of the product stream in the load container to be filled is adjustable by sensors.

17. A device as defined in claim 1, wherein said ejection element is formed as an outlet pipe of the harvesting machine.

18. A device as defined in claim 1, wherein said ejection element is formed as a transfer band of a potato harvester.

19. A device as defined in claim 1, wherein said ejection element is formed as a harvester band of a sugar beet digger.

20. A device for automatic filling of a traveling load container with a product stream from an adjacent traveling harvesting machine, comprising a throwing element turnable about at least one axis selected from the group consisting of a vertical axis and a horizontal axis; a distance sensor measuring a lateral distance between the harvesting machine and the load container and supplying measured distance values; a device for measuring a through flow quantity which produces throughflow quantity data; an electronic evaluating and control unit which controls a turning position of said ejection element, said electronic evaluating and control unit receiving container nominal size data, said measured distance values from said distance sensor, and said throughflow quantity data from said throughflow quantity measuring device; and a transfer device controlled by said evaluating and control unit in correspondence with the container nominal size data, the received values of the lateral distance between the harvesting machine and the load container and the through flow quantity data.

* * * * *